(12) United States Patent
Qi et al.

(10) Patent No.: US 7,905,977 B2
(45) Date of Patent: Mar. 15, 2011

(54) POST CONVERSION METHODS FOR DISPLAY DEVICES

(75) Inventors: Jun Qi, Milpitas, CA (US); John Hanan Liu, Mountain View, CA (US); Yi-Shung Chaug, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 291 days.

(21) Appl. No.: 11/941,654

(22) Filed: Nov. 16, 2007

(65) Prior Publication Data
US 2008/0149271 A1 Jun. 26, 2008

Related U.S. Application Data

(60) Provisional application No. 60/866,379, filed on Nov. 17, 2006.

(51) Int. Cl.
*B26C 65/18* (2006.01)
(52) U.S. Cl. .................. 156/247; 359/296; 349/151
(58) Field of Classification Search .............. 156/281, 156/247; 349/151; 359/296
See application file for complete search history.

(56) References Cited

U.S. PATENT DOCUMENTS

| | | | |
|---|---|---|---|
| 3,612,758 A | 10/1971 | Evans | |
| 5,930,026 A * | 7/1999 | Jacobson et al. | 359/296 |
| 5,938,882 A | 8/1999 | Bryant et al. | 156/344 |
| 5,961,804 A | 10/1999 | Jacobson et al. | |
| 6,672,921 B1 | 1/2004 | Liang et al. | |
| 6,795,138 B2 | 9/2004 | Liang et al. | |
| 6,873,452 B2 | 3/2005 | Tseng et al. | 359/296 |
| 6,906,779 B2 * | 6/2005 | Chan-Park et al. | 355/50 |
| 6,927,892 B2 | 8/2005 | Ho et al. | |
| 6,930,818 B1 | 8/2005 | Liang et al. | 359/296 |
| 6,933,098 B2 | 8/2005 | Chan-Park et al. | |
| 7,141,279 B2 | 11/2006 | Liang et al. | |
| 7,245,414 B2 | 7/2007 | Liang et al. | |
| 7,729,039 B2 * | 6/2010 | LeCain et al. | 359/296 |
| 2005/0012881 A1 | 1/2005 | Liang et al. | |
| 2006/0215102 A1 | 9/2006 | Otose et al. | 349/151 |

OTHER PUBLICATIONS

Allen, K. (Oct. 2003). Electrophoretics Fulfilled. *Emerging Displays Review: Emerging Display Technologies*, Monthly Report—Oct. 2003, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814.I9.6.1.

Chen, S.M. (Jul. 2003) The Applications for the Revolutionary Electronic Paper Technology. *OPTO News & Letters*, 102, 37-41. (in Chinese, English abstract attached).

(Continued)

*Primary Examiner* — Philip C Tucker
*Assistant Examiner* — Vishal I Patel
(74) *Attorney, Agent, or Firm* — Howrey LLP

(57) ABSTRACT

The present invention relates to the use of a scraping element for removing part of a display film coated or laminated to an electrode layer to expose the electrode layer for connection to a drive circuitry. The present invention is directed to a method for removing a portion of a display film coated or laminated on an electrode layer, a process for preparing a display device, and a process for preparing a passive matrix display device.

10 Claims, 6 Drawing Sheets

OTHER PUBLICATIONS

Chen, S.M. (May 2003) The New Application and the Dynamics of Companies. *TTI*. 1-10. (in Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA.

Ho, C., & Liang, R.C. (Dec. 2003). *Microcup ® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hopper, M. A. et al, "An Electrophoretic Display, its Properties, Model and Addressing", IEEE Transactions on Electron Devices, 26(8): 1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup® Active and Passive Matrix Electrophoretic Displays by a Roll-to-Roll Manufacturing Processes. *SID Digest*, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices, 3*. (in Japanese, with English translation).

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE—IS&T Electronic Imaging, SPIE* vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup ® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

Zang, Hongmei. (Feb. 2007) *Developms in Microcup® Flexible Displays*. Presidentation conducted at the 6th Annual Flexible Display and Microelectronics Conference, Phoenix, AZ Feb. 6-8.

\* cited by examiner

POST CONVERSION METHODS FOR DISPLAY DEVICES

This application claims priority to U.S. provisional application No. 60/866,379, filed Nov. 17, 2006. The content of which is incorporated herein by reference in its entirety.

BACKGROUND OF THE INVENTION

1. Field of the Invention

The invention is directed to methods of post conversion for display devices.

2. Description of Related Art

An improved electrophoretic display technology is described in U.S. Pat. Nos. 6,930,818, 6,933,098 and 6,672,921, all of which are incorporated herein by reference in their entirety. An electrophoretic display film prepared by this technology comprises closed cells formed from microcups of well-defined shape, size and aspect ratio, filled with charged pigment particles dispersed in a dielectric solvent or solvent mixture and sealed with a polymeric sealing layer.

Other types of display (e.g., liquid crystal display, electrodeposition display, electrochromic display or the like) may also be prepared by the microcup technology (see, for example, U.S. Pat. Nos. 6,795,138; 7,141,279; and 7,245,414; and US Patent Application Publication No. 2005-001288;, all of which are incorporated herein by reference in their entirety).

A microcup-based electromagnetophoretic display (EMPD) technology is disclosed in U.S. Pat. No. 6,927,892, the content of which is also incorporated herein by reference.

The display devices mentioned above may be manufactured by laminating one or both sides of a display film with electrode layer(s). In the case of a passive matrix display device, a display film may be sandwiched between two patterned electrode layers in line format. For a segment display device, a display film is sandwiched between one common electrode layer and a patterned electrode layer which may be a printed circuit board. For an active matrix display device, a display film is sandwiched between a common electrode layer and a thin film transistor (TFT) layer. There may also be display devices such as display devices driven by an in-plane mode or electromagnetophoretic displays in which a display film is sandwiched between a common electrode layer and a substrate layer.

The common electrode layer(s) in a segment or active matrix display device often need to be partially exposed in order to be connected to a driver circuitry. For a passive matrix display device, one of the line patterned electrode layer also needs to be partially removed for electrical connection. Previously, in assembling a display device, the exposure of electrode lines was accomplished by asymmetric lamination of the electrode layers to a display film. Asymmetric lamination is a batch-wise process. In other words, the display film is laminated piece by piece; thus the process has a very low throughput.

In U.S. Pat. No. 6,873,452, the content of which is incorporated herein by reference in its entirety, a post conversion process involving solvent stripping is described. In such a process, a solvent (e.g., acetone or methylethyl ketone) is used to remove a portion of the display film in order to expose electrode lines of the electrode layers laminated to the display film. Before stripping, however, the part of the display film not to be removed must first be edge sealed by covering it with a releasable protection film to protect it from the stripping solvent and the stripping step must also be carried out in a very gentle manner in order to protect both the electrode layers and the display film not to be removed. Such a process therefore is difficult to implement in large scale manufacturing.

Alternatively, dry brush may be used to remove part of the display film to expose the common electrode or electrode lines on an electrode layer. However, the debris of the removed film tends to be attached to the brush, thus significantly reducing the processing speed. The dry brush method may also generate cross-contamination.

SUMMARY OF THE INVENTION

The present invention is directed to methods of post conversion for display devices.

The first aspect of the invention is directed to the use of a scraping element for removing part of a display film coated or laminated to an electrode layer to expose the electrode layer for connection to a drive circuitry. The scraping element has a flat tip.

The second aspect of the invention is directed to post conversion methods for segment or active matrix display devices.

The third aspect of the invention is directed to post conversion methods for passive matrix display devices.

The present methods do not involve solvent or dry brush stripping. Therefore the problems associated with those previous methods are all eliminated.

Furthermore, the moving speed and/or dimensions of the tip area of the scraping element may be adjusted and controlled to allow the present methods to be incorporated into roll-to-roll large scale manufacturing of display devices.

Detailed of the present methods are described in sections below.

DETAILED DESCRIPTION OF THE INVENTION

Unless defined otherwise in this specification, all technical terms are used herein according to their conventional definitions as they are commonly used and understood by those of ordinary skill in the art.

Figure 1A:
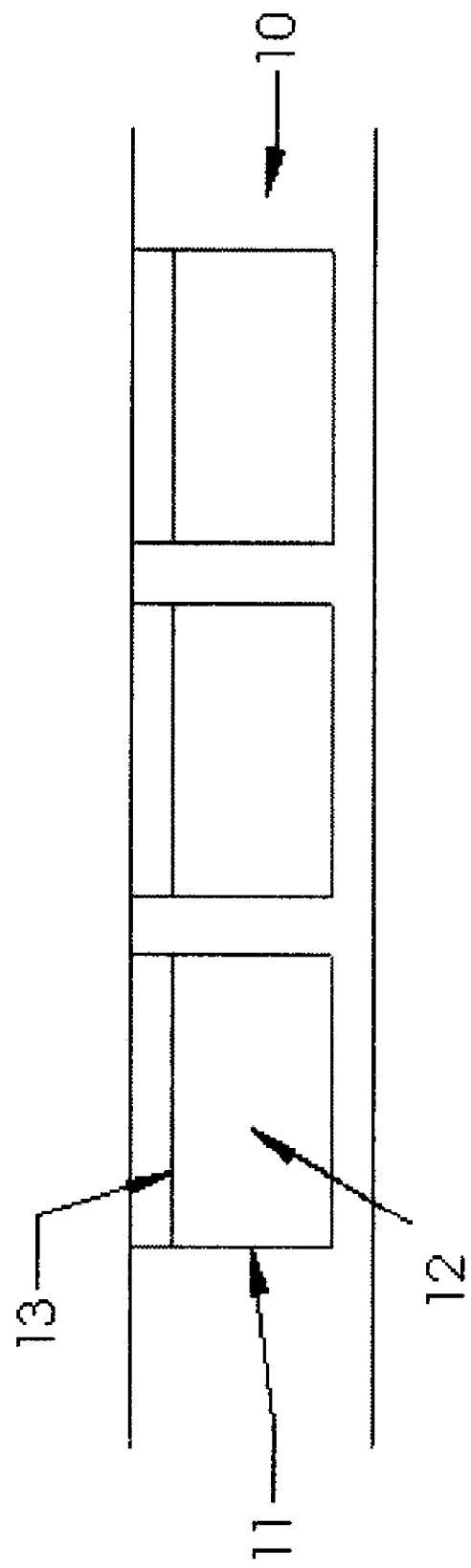
FIGS. 1a-1c are a schematic depiction of a display film or display device prepared by the microcup technology.

FIG. 1a is a schematic depiction of a display film prepared by the microcup technology. The microcup based display cells (11) are filled with a display fluid (12) and sealed with a polymeric sealing layer (13). In the context of the present application, such a film is referred to as a "display film" (10). A display device (15) may be prepared from the display film (10) as shown in FIGS. 1b and 1c.

Figure 1C:
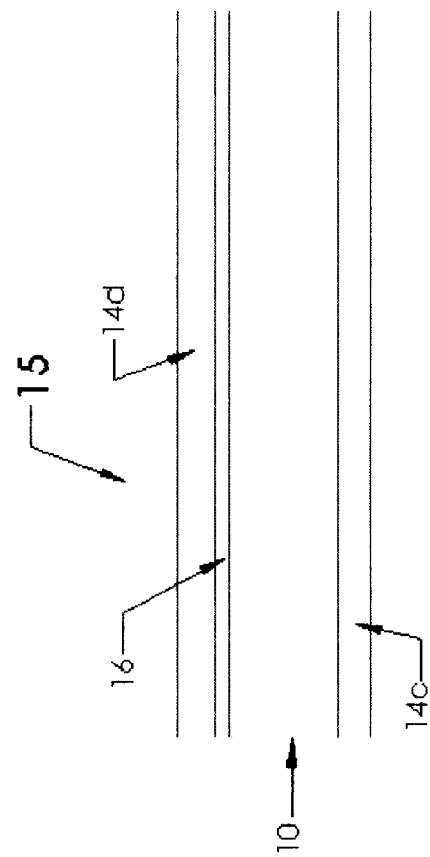
Figure 1B:
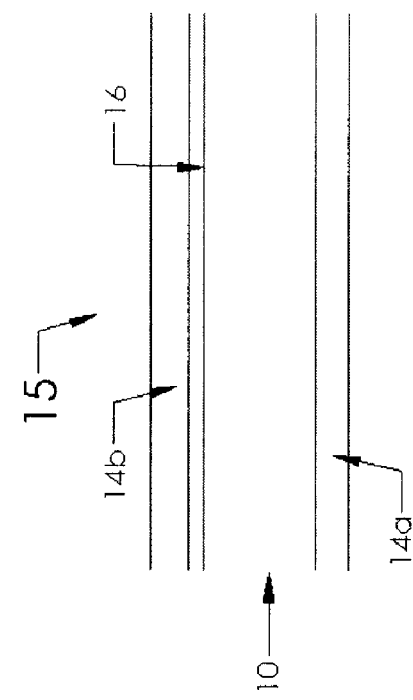

In FIG. 1b, the display film (10) is sandwiched between two electrode layers (14a and 14b). The display cells (11) may be formed on one of the electrode layers (e.g., 14a). After the display cells are filled and sealed, the other electrode layer (e.g., 14b) is laminated over the filled and sealed display cells, optionally with an adhesive layer (16). In the display device shown, either the side of the electrode layer 14a or the electrode layer 14b may be the viewing side. The electrode layer on the viewing side must be transparent. There may also be a primer layer (not shown) between the display cells (11) and the electrode layer on which the display cells are formed.

For the in-plane switching display devices or electromagnetophoretic displays, as shown in FIG. 1c, the display film (10) is sandwiched between one electrode layer (14c) and one substrate layer (14d). The display cells (11) may be formed on the electrode layer (14c). After the display cells are filled and sealed, the substrate layer (14d) is laminated over the filled and sealed display cells, optionally with an adhesive layer (16). In the display device shown, either the side of the electrode layer 14c or the substrate layer 14d may be the viewing side. The electrode layer or the substrate layer on the viewing side must be transparent. There may also be a primer layer (not shown) between the electrode layer (14c) and the display cells (11) if the display cells are formed on the electrode layer (14c). Alternatively, the display cells (11) may be formed on the substrate layer (14d) and, in this case, the electrode layer (14c) is laminated over the filled and sealed display cells.

While the microcup-based display film and display devices are specifically discussed in this application, it is understood that the methods of the present invention can be easily adapted to display films or display devices prepared by other technologies, such as the partition type display devices (see M. A. Hopper and V. Novotny, IEEE Trans. Electr. Dev., 26(8):1148-1152 (1979)), the microcapsule-based display devices (as described in U.S. Pat. Nos. 5,961,804 and 5,930,026), the display devices with channel-like display cells (see, for example, U.S. Pat. No. 3,612,758) and other known types of display devices.

It is further noted that the application of the methods of the present invention is not limited to electrophoretic display film or devices. The methods are also applicable to other types of display film or devices, such as liquid crystal display, electrodeposition display, electrochromic display or electromagnetophoretic display (EMPD) and especially those mentioned in the Related Art section above.

The present invention is directed to a method for removing a portion of a display film coated or laminated on an electrode layer. The method can be used in the preparation of an electrophoretic or liquid crystal display device. The method comprises: (a) heating a tip area of a scraping element to, or above, the glass transition temperature of the display film, and (b) scraping a portion of the display film with the scraping element. In one embodiment, the tip area is heated at a temperature of at least about 80° C. to about 100° C. The tip area is preferably in contact with the surface of the portion of the display film at an angle of about 30° to about 45°. In one embodiment, the tip area comprises a sharp curvature edge. In general, the tip area comprises a tip and the tip is used to scrape the portion of the display film. The method optionally comprises the step of removing debris of the removed display film.

The present invention is also directed to a process for preparing a display device. The process comprises: (a) heating a tip area of a scraping element to, or above, the glass transition temperature of the display film; (b) scraping a portion of a display film coated or laminated on a first electrode layer to form an open area with the scraping element; (c) filling the open area with a conductive adhesive or tape; and (d) laminating a second electrode layer over the display film. In one embodiment, the first electrode layer is a common electrode layer and the second electrode layer is a patterned electrode layer, wherein the patterned electrode layer has a non-conductive gap which divides the patterned electrode layer into two sections and the process further comprises connecting the two sections separately to a driver. In another embodiment, the first electrode layer is a common electrode layer and the second electrode layer is a thin film transistor layer, wherein the thin film transistor layer has a non-conductive gap which divides the thin film transistor layer into two sections, and the process further comprises connecting the two sections separately to a driver.

In yet another embodiment, the first electrode layer is a patterned electrode layer and the second electrode layer is a common electrode layer.

The present invention is further directed to a process for preparing a passive matrix display device. The process comprises: (a) heating a tip area of a scraping element to, or above, the glass transition temperature of the display film, (b) scraping a portion of a display film coated or laminated on a first side of the display film with the scraping element, wherein said display film is coated or laminated on a first line patterned electrode layer; and (c) laminating a second line patterned electrode layer over the display film with the second line patterned electrode layer exceeding the edge of the display film on a second side of the display film. In one embodiment, the second side of the display film is about 90° from the first side of the display film.

The present invention is further directed to a process for preparing a passive matrix display device. The process comprises: (a) providing a display film sandwiched between a first line patterned electrode layer and a second line patterned electrode layer; (b) removing a portion of the first line patterned electrode layer to expose a first portion of the display film; (c) heating a tip area of a scraping element to, or above, the glass transition temperature of the display film; (d) scraping the exposed first portion of the display film with the scraping element; (e) removing a portion of the second line patterned electrode layer to expose a second portion the display film; and (e scraping the exposed second portion of the display film with the tip of the scraping element.

Glass transition temperature, as used herein, refers to the temperature at which the transition between the glassy state and rubbery state occurs in the amorphous regions of semi-crystalline solids. Below the glass transition temperature, amorphous materials are in glassy state and most of their joining bonds are intact. With increasing temperature, more and more joining bonds are broken by thermal fluctuations so that broken bonds begin to form clusters. Above the glass transition temperature, these clusters become macroscopic large facilitating the flow of material.

Specific Embodiments of the Present Invention
1) Segment Display Devices

FIGS. 2a-2d illustrate a post converting method for a segment display device.

Figure 2A:
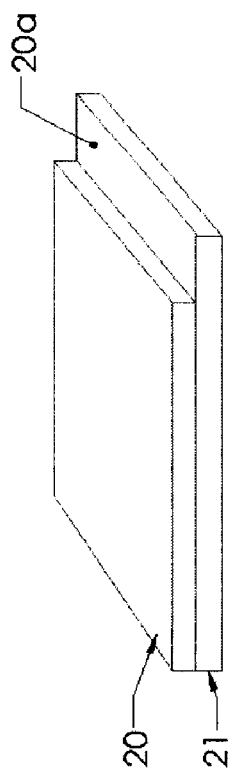
FIGS. 2a-2d illustrate a post conversion method for a segment display device.

The display film (20) is formed on a common electrode layer (21) (see FIG. 2a).

Figure 2B:
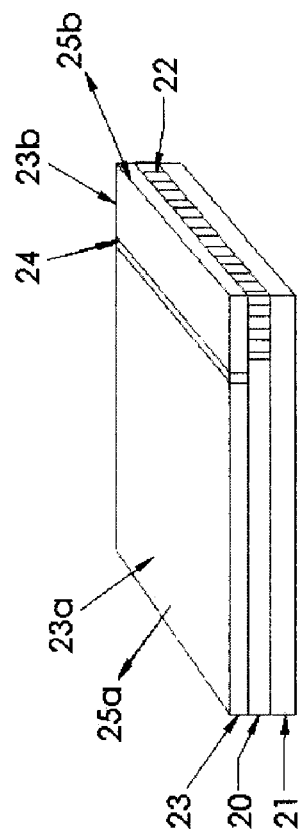

In order to expose the common electrode layer (21), an area (20a) on the edge of the display film is removed (see FIG. 2b). The removal is accomplished by using a scraping element with a flat tip (as described below).

Figure 2C:
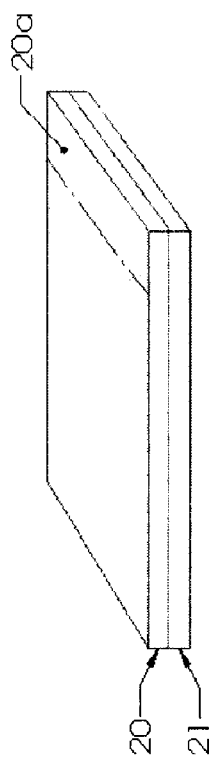

After the area (20a) of the display film is removed, a conductive adhesive (22) or conductive tape is filled into the open area (20a) (see FIG. 2c).

Figure 2D:
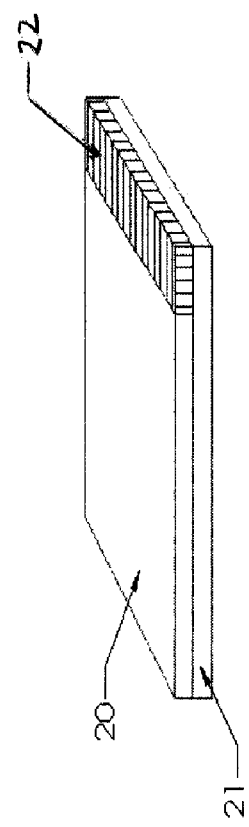

Finally a patterned electrode layer (e.g., printed circuit board or an electric circuit on a flexible substrate) (23) is laminated over the display film as shown in FIG. 2d. There is a non-conductive gap area (24) on the patterned electrode layer (23) to divide the patterned electrode layer into two sections, 23a for the segment electrodes and 23b connected to the common electrode layer.

In the final display device, the terminal (25a) of section 23a and the terminal (25b) of the section 23b are separately connected to a driver where the section 23*b* are electrically connect to the common electrode layer (21) through the conductive adhesive or conductive tape (22). While other types of connection to a driver circuitry are possible, the type of connection shown in the figure is one of the preferred.

In operation, voltages are applied to the two connecting terminals (25*a* and 25*b*) to cause a voltage difference between the patterned electrode layer (23*a*) and the common electrode layer (21), which voltage difference drives the display device.

Figure 3:
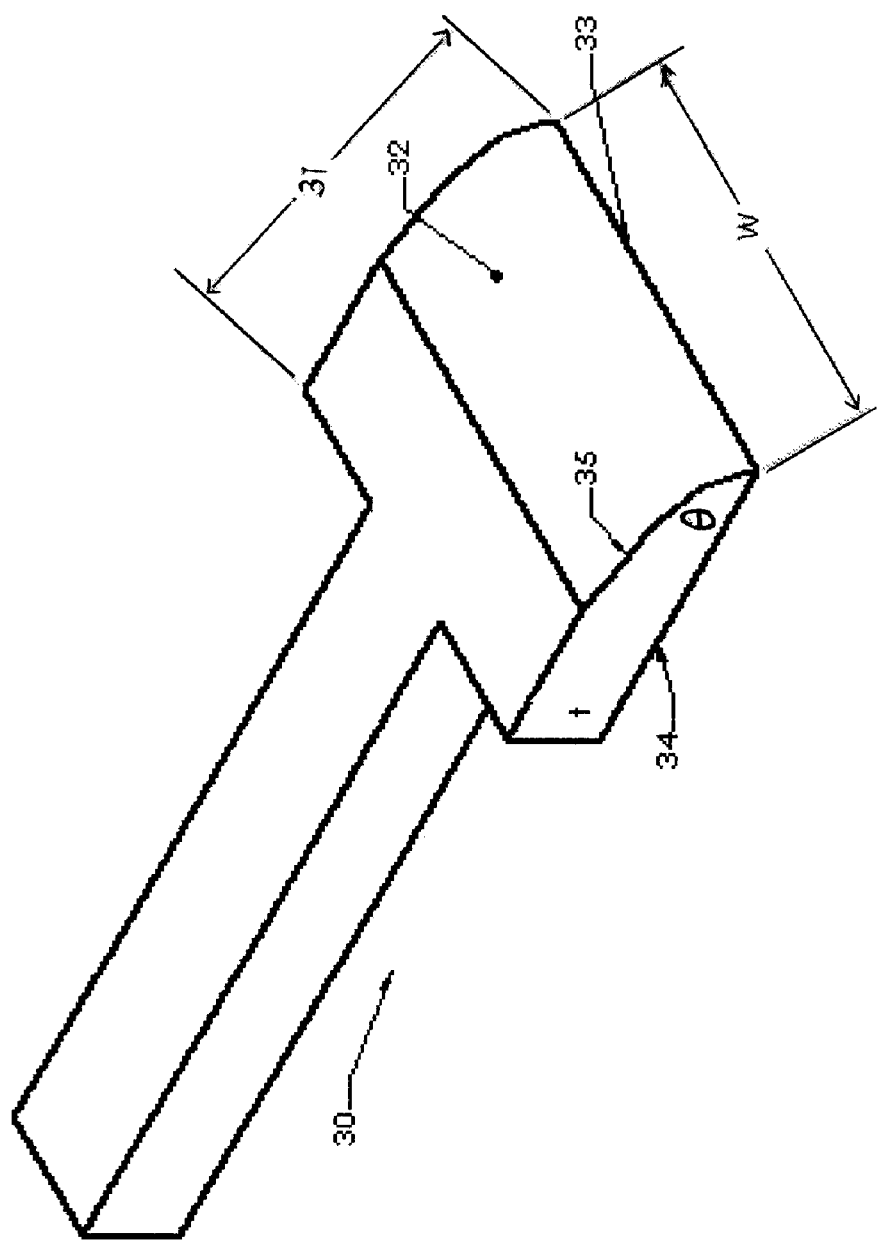
FIG. 3 shows a variety of scraping elements suitable for the present invention.

The scraping element (30) used in the method is shown in FIG. 3. The element has a tip area (31) and the tip area has an edge area (32). The width (w) of the tip (33) of the edge area (32) may vary, depending on the area of the display film to be removed. The shape of the tip area preferably is square or rectangular. One side of the tip area is preferably flat and therefore the bottom line (34) of the tip area is preferably straight. The top edge line (35) of the edge area may be curved or straight. The angle (θ) of the edge area preferably vary between about 10° and about 45°, more preferably between about 15° to about 30°. However the tip of the angle (θ) preferably is not pin-like sharp to avoid causing damage to the electrode layer underneath of the display film to be removed.

The thickness (t) of the tip area also may vary. The tip area (31) of the scraping element is preferably heated to a temperature in the range of the glass transition temperature of the display film, more preferably in the range of 80° C. to 100° C. The temperature may be monitored and controlled by a thermal couple and a power source. When removing a section of the display film, the tip (33) of the edge area (32) is in contact with the surface of the display film, preferably at an angle of about 30° to about 45°.

While only one example of the scraping element is shown, it is understood that the present invention encompasses other alternative physical designs serving the same or similar functions.

When incorporated into a roll-to-roll continuous process, the moving speed of the scraping element may be adjusted, depending on the moving speed of the display film, to achieve maximum stripping efficiency.

The tip area (31) is preferably formed of a metal such as copper, copper alloy or other metals which would allow the tip surface to have an acceptable texture.

A vacuum nozzle may be installed adjacent to the tip area of the scraping element and the vacuum nozzle will keep the processing line clean by continuously vacuuming up the debris of the removed display film.

In FIG. 2, the common electrode layer (21) is the viewing side and is transparent. The transparent electrode layer may be an ITO (indium oxide and titanium oxide), IZO (indium oxide and zinc oxide), IWO (indium oxide and tungsten oxide), ZaO (zinc oxide and aluminum oxide) or a conducting polymer coating. On the surface of the display film on the viewing side, there may also be a hard coated barrier for protection of the surface of the display film, or a gas barrier coating, or an anti-glare coating, or an anti-scratch coating.

2) Active Matrix Display Devices

An active matrix display device may be similarly prepared according to the steps of FIGS. 2*a*-2*d*, except that the patterned electrode layer (23) is replaced with a thin film transistor (TFT) layer. On the TFT layer (which may be glass-based or plastic-based), there is also a non-conductive gap similar to the gap 24 in FIG. 2*d*, to separate the TFT layer into two sections, 23*a* for the pixel matrix and 23*b* connected to the common electrode layer. The driving of the active matrix display device is also achieved by applying different voltages to the two terminals (25*a* and 25*b*) as shown in FIG. 2.

3) Passive Matrix Display Devices

Figure 4A:
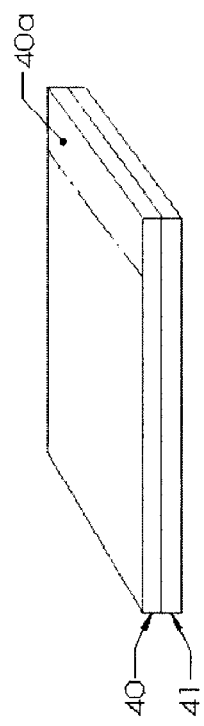
FIGS. 4a-4c illustrate a post conversion method for a passive matrix display device.
Figure 4B:
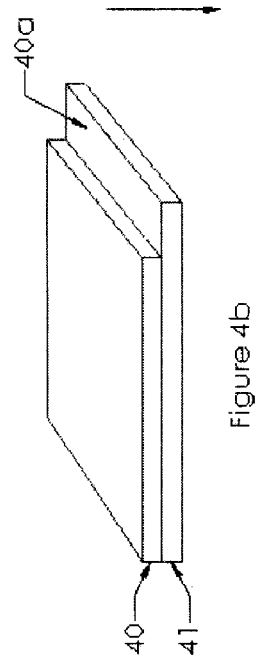
Figure 4C:
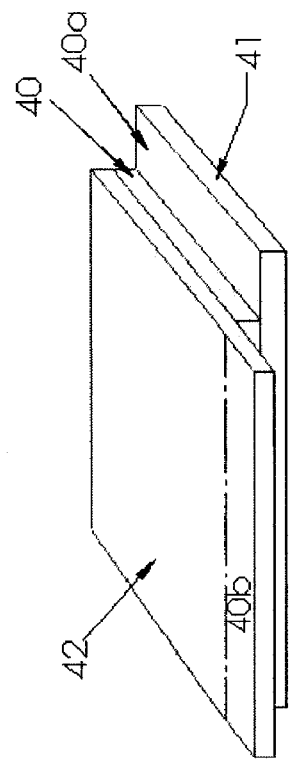

FIGS. 4*a*-4*c* illustrate a post conversion method for a passive matrix display device.

The display film (40) is formed on an electrode layer (41) (see FIG. 4*a*).

In order to expose the electrode lines of the electrode layer (41), an area (40*a*) on the edge of the display film is removed (see FIG. 4*b*). The removal is accomplished by using a scraping element with a flat tip as shown in FIG. 3.

A second electrode layer (42) is laminated over the remaining display film with the edge of the electrode layer exceeding the edge of the display film on one side (which is usually 90° from the side where a section of the display film has been removed) (see FIG. 4*c*). The electrode lines of both the electrode layer (41) and the electrode layer (42) face the display film. The two sets of the electrode lines are perpendicular to each other.

The configuration of the electrode layers as shown in FIG. 4*c* allows the electrode lines in areas 40*a* and 40*b* to be exposed for connection to a driver circuitry. The display device is driven by applying different voltages to the two electrode layers 41 and 42.

At least one of the two electrode layers (41 and 42) is transparent and the transparent electrode layer is on the viewing side. The surface of the display film on the viewing side may also have additional coatings (e.g., a hard coated barrier layer, a gas barrier coating, an anti-glare coating or an anti-scratch coating) as described above.

Alternatively a passive matrix display device may be post converted with both electrode layers laminated on the display film as shown in FIG. 5*a*-5*d*.

In this alternative method, a section (50*a*) of the first electrode layer (52) is first removed by, for example, a die, diamond, knife or laser cutting. The cut may optionally extend into the display film (50) underneath the electrode layer (52); but not into the second electrode layer (51) (see FIG. 5*b*). The exposed display film (50) in the area (50*a*) is then subjected to removal by a scraping element as shown in FIG. 3.

Figure 5B:
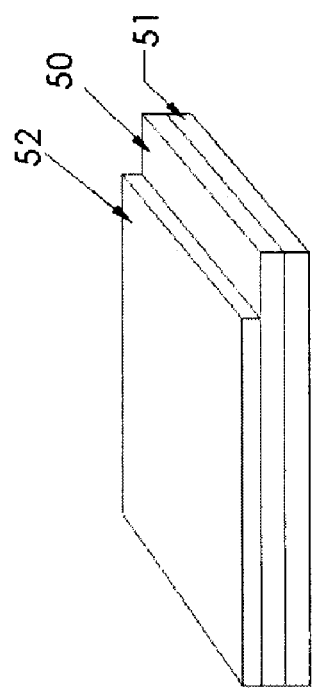
FIGS. 5a-5d illustrate an alternative post conversion method for a passive matrix display device.
Figure 5D:
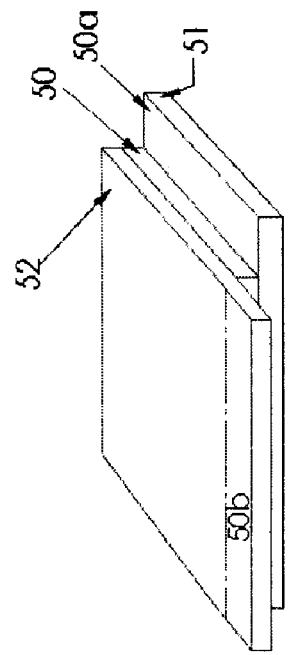
Figure 5A:
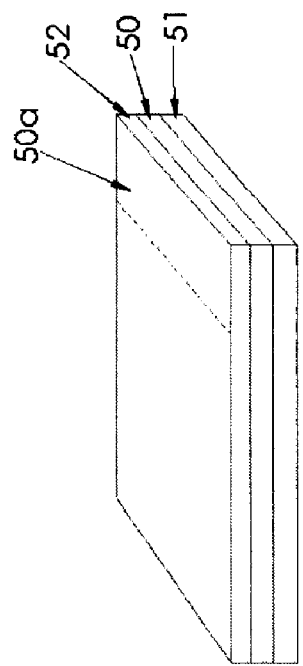
Figure 5C:
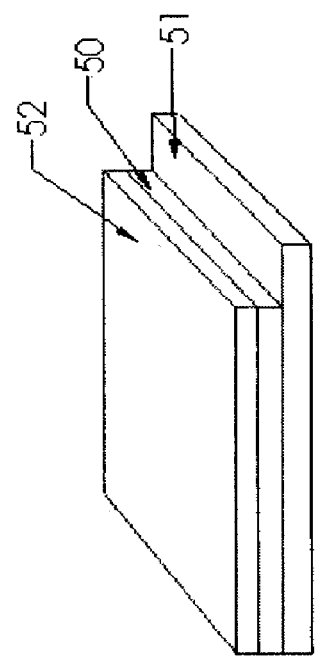

After area 50*a* of the display film is removed, the electrode lines of the second electrode layer (51) in the area (50*a*) are exposed and ready for connection to a driver circuitry (FIG. 5*c*).

Similarly the same steps are repeated by first cutting the second electrode layer (51) as shown in FIG. 5*d* in the area 50*b*, followed by removing the display film in area 50*b* using a scraping element as described above to expose the electrode lines on the first electrode layer (52) in area 50*b*.

The exposed electrode lines of each of the two electrode layers are connected to a driver circuitry to drive the passive matrix display device.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. a process for preparing a display device, which process comprises:
    (a) providing a display film coated or laminated on a first electrode layer; wherein said display film is selected from the group consisting of: a microcup-base display film, a partition type-based display film, a microcapsule-based display film, or channel-like display cells;

(b) removing a portion of the display film to form an open area;

(c) filling the open area with a conductive adhesive or conductive tape;

(d) laminating a Second electrode layer over the display film, wherein the second electrode layer comprises a non-conductive gap which divides the second electrode layer into two sections and one of said two sections is electrically connected to said first electrode layer through said conductive adhesive or conductive tape, and (e) connecting separately the two sections of said second electrode layer to a driver.

2. The process of claim 1, wherein said first electrode layer is a common electrode layer and the second electrode layer is a patterned electrode layer.

3. The process of claim 1, wherein said first electrode layer is a common electrode layer and the second electrode layer is a thin film transistor layer.

4. The process of claim 1, wherein said first electrode layer is a patterned electrode layer and the second electrode layer is a common electrode layer.

5. The method of claim 1, wherein the removing is accomplished by scraping.

6. The method of claim 5, further comprising heating a tip area of a scraping element to, or above, the glass transition temperature of the display film, and the scraping is carried out with the tip area of the scraping element.

7. The method of claim 6, wherein said tip area comprises a sharp curvature edge.

8. The method of claim 6, wherein said glass transition temperature is about 80° C. to about 100° C.

9. The method of claim 6, wherein said tip area is in contact with the surface of the portion of the display film at an angle of about 30° to about 45°.

10. The methhod of claim 1, further comprising removing debris of the removed display film.

\* \* \* \* \*